United States Patent [19]

Gruhn et al.

[11] Patent Number: 4,661,406
[45] Date of Patent: Apr. 28, 1987

[54] STRENGTH ELEMENT FOR FIBER OPTIC CABLES

[75] Inventors: Joel D. Gruhn; Mark R. Canrobert; Robert E. Nelson, all of Hickory, N.C.

[73] Assignee: Neptco Incorporated, Pawtucket, R.I.

[21] Appl. No.: 751,370

[22] Filed: Jul. 2, 1985

[51] Int. Cl.[4] .................. D02G 3/00; G02B 6/44; B32B 9/00
[52] U.S. Cl. .................. 428/397; 350/96.23; 428/367; 428/392; 428/395; 428/375
[58] Field of Search ............. 428/397, 375, 367, 392, 428/395; 350/96.23; 264/177 R, 177 F; 501/95

[56] References Cited

U.S. PATENT DOCUMENTS

| | | | |
|---|---|---|---|
| 2,684,318 | 7/1954 | Meek . | |
| 2,871,911 | 2/1959 | Goldsworthy et al. . | |
| 2,948,649 | 8/1960 | Pancherz . | |
| 3,556,888 | 1/1971 | Goldsworthy et al. | 156/73 |
| 3,623,939 | 11/1971 | Ono et al. | 428/397 X |
| 3,684,622 | 8/1972 | Goldsworthy et al. | 156/441 |
| 3,802,177 | 4/1974 | Sekiguchi et al. | 428/397 X |
| 3,960,629 | 6/1976 | Goldsworthy | 156/180 |
| 4,168,194 | 9/1979 | Stiles | 156/166 |
| 4,199,224 | 4/1980 | Oestreich | 350/96.23 |
| 4,285,749 | 8/1981 | Stiles | 156/180 |
| 4,305,770 | 12/1981 | Stiles | 156/180 |
| 4,361,381 | 11/1982 | Williams | 350/96.23 |
| 4,401,366 | 8/1983 | Hope | 350/96.23 |

*Primary Examiner*—Lorraine T. Kendell
*Attorney, Agent, or Firm*—Salter & Michaelson

[57] ABSTRACT

A strength element for a fiber optic transmission cable is integrally formed from a fiber reinforced resin material and it comprises a longitudinally extending central portion and a plurality of longitudinally extending ribs which project substantially radially outwardly from the central portion and define a plurality of substantially longitudinally extending grooves for receiving and positioning optical fibers around the strength element. The ribs are preferably formed in outwardly tapered configurations, and the outer terminal ends of the ribs and the inner extremities of the grooves between the ribs are preferably formed in rounded configurations to increase the resistance of the strength element to breakage during bending.

6 Claims, 4 Drawing Figures

STRENGTH ELEMENT FOR FIBER OPTIC CABLES

BACKGROUND AND SUMMARY OF THE INVENTION

The instant invention relates to fiber optic transmission cables and more particularly to a reinforcing element for reducing the susceptibility of a fiber optic transmission cable to physical damage, such as thermal stresses or stresses caused during installation procedures.

It has generally been found that it is necessary to provide some means for reinforcing optical glass fibers when they are used in applications wherein they are likely to be exposed to tensile and/or sheer stresses. In this regard, while flawless glass fibers generally have relatively high tensile strengths, most glass fibers, such as those used in fiber optic transmission cables, have at least some minor physical defects which are known to propagate under mechanical stresses, substantially reducing their tensile strengths and rendering them prone to mechanical failure. Since fiber optic cables are often exposed to substantial tensile stresses when they are installed in conduits, some means for reinforcing the fibers of fiber optic cables is generally necessary to prevent them from fracturing during installation procedures for both underground and overhead applications. In addition, since the optical fibers in fiber optic cables are also likely to be exposed to both tensile and compressive forces during normal use due to variations in the thermal expansion coefficients of the various components of the fiber optic cables in which they are assembled, some means is generally necessary for reinforcing the fibers of fiber optic cables during normal use as well.

Accordingly, for the above reasons, most fiber optic transmission cables generally include strength reinforcing elements for minimizing the stresses on the optical glass fibers thereof. Such strength elements are typically constructed of materials having high tensile strengths, and high Young's moduli, but which are nevertheless relatively flexible, such as fiber reinforced resin materials or steel. In this regard, however, since electrically conductive strength elements are prone to attracting atmospheric lightning discharges when they are used in aerial installations, it has been found that electrically nonconductive strength elements are preferable for aerial applications. Further, nonconductive strength elements have also been found to be preferable for applications such as in explosive areas or in areas of high electromagnetic interference, for example in electrical power distribution corridors.

A variety of different fiber optic cable constructions which have comprised strength elements of various types have been heretofore available. In this regard, typically, most strength elements have been formed as elongated wire-like elements of substantially circular cross section and they have been used in cables in combination with various fiber supporting structures. Strength elements of this type have generally been assembled with various casings or outer jackets to form fiber optic cables, wherein the optical fibers thereof are positioned in predetermined orientations by the fiber supporting structures thereof, and protected against excessive stresses by the strength elements thereof. The fiber optic cables disclosed in the U.S. Pat. No. 4,038,489 to Stenson et al; King et al U.S. Pat. No. 4,154,049; Oestreich U.S. Pat. No. 4,199,224; Yonecki U.S. Pat. No. 4,235,511; Arnaud U.S. Pat. No. 4,354,732; Williams U.S. Pat. No. 4,361,381; Trezequet U.S. Pat. No. 4,389,088; Hope U.S. Pat. No. 4,401,366; Le Noane et al U.S. Pat. No. 4,408,828; Smith U.S. Pat. No. 4,435,238; Whitehead et al #4,456,331; Yataki U.S. Pat. No. 4,474,426 are exemplary in this regard and all comprise elongated strength elements of substantially circular cross section, elongated fiber supporting structures and outer sheaths or casings. In addition, many of the cables disclosed in the above references are constructed so that the fiber supporting structures thereof are extruded over the strength elements thereof to provide longitudinal channels for receiving optical fibers therein and many of the cables disclosed in references include various waterproof gels for protecting the optical fibers thereof against water damage and freezing. The U.S. Pat. No. 4,227,770 to Gunn; Nakagome et al U.S. Pat. No. 4,257,675 and Trezeguet et al U.S. Pat. No. 4,422,889 disclose various other fiber optic cable constructions, some of which comprise strength elements of noncircular sectional configuration. However, while the various references hereinabove cited represent the closest prior art to the instant invention of which the applicant is aware, they fail to disclose or suggest, a strength element for a fiber otpic cable which embodies the novel structural features of the strength element of the instant invention and hence, these references are believed to be of only general interest. More specifically in this regard, the above references, fail to disclose or suggest a strength element which is integrally formed from a fiber reinforced resin material and which has the novel and unobvious sectional configuration of the strength element of the instant invention as will hereinafter be made apparent.

The instant invention provides an effective strength element for a fiber optic cable which has substantial advantages over the heretofore available strength elements. In particular, the instant invention provides a strength element which can be effectively utilized for constructing a fiber optic cable having a signficantly reduced sectional dimension without reducing the transmission capacity of the cable. In this regard, the strength element of the instant invention comprises an elongated central portion and at least three substantially longitudinally extending ribs which extend outwardly from the central portion to define substantially longitunally extending grooves therebetween in the strength element. The strength element is integrally formed from a fiber reinforced resin material and the ribs are preferably formed so that they extend substantially radially outwardly from the central portion and so that they are tapered in their outward extents from the central portion. More specifically, the ribs are preferably formed so that the opposite sides of each thereof define an angle therebetween of between approximately 6° and 70°. The ribs are preferably further formed so that the outer extremities thereof are of rounded configuration and so that the inner extremities of the grooves which are formed between the ribs are also of rounded configuration. In this regard, the grooves between the ribs are preferably formed so that the radii of curvature thereof are between approximately 1 and 1/20 of the outward extents of the adjacent ribs from the central portion. Further, the strength element is are preferably formed so that the ribs thereof twist or spiral around the central portion in their longitudinal extents in the strength element, or alternatively so that they twist or spiral in periodically reversing directions around the central portion.

It has been found that the strength element of the instant invention can be effectively utilized for constructing a fiber optic cable of substantially reduced diameter and hence, also reduced cost. Specifically, because the strength element of the instant invention is integrally formed of a fiber reinforced resin material in the configuration hereinabove specified, it can function as both a strength element for reinforcing the optical fibers in a cable and as a supporting structure for receiving and positioning the optical fibers, and that therefore a cable constructed therewith can be made in a reduced overall maximum sectional dimension. In this regard, because of the configuration of the strength element of the instant invention, when it is assembled with optical fibers for use in a cable so that the fibers are received in the grooves in the strength element, the overall maximum sectional dimensions of the assembly comprising the strength element and the fibers is substantially the same as the maximum sectional dimension of the strength element by itself. On the other hand, when a conventional strength element of substantially circular cross section, but substantially the same maximum overall sectional dimension, is assembled with optical fibers for use in a cable so that the fibers are disposed around the circumference of the strength element, the assembly comprising the conventional strength element and the optical fibers has a maximum sectional dimension which is substantially greater than the maximum sectional dimension of conventional strength element by itself. Hence, the overall sectional dimension of a cable constructed with the strength element of the instant invention is substantially less than that of a conventional fiber optic cable of similar transmission capacity and as a result substantial savings in material costs are realized. Further, it has been found that the specific sectional configuration of the strength element of the instant invention herein specified provides effective resistance to breakage during the type of bending thereof which is likely to occur during cable installation procedures and/or during normal use. More specifically, it has been found that the outwardly tapered configurations of the ribs, the rounded terminal ends of the ribs, and the rounded configurations of the inner extremities of the grooves between the ribs substantially increase the resistance of the strength element to breakage during bending as compared to a strength element having longitudinally extending ribs and grooves which do not embody these features. Further, it has been found that the strength element provides substantial resistance to the other forces to which optical fibers are exposed during normal use, such as, those resulting from the differences in the thermal expansion coefficients of various cable components. Hence, it is seen that for the above reasons, the strength element of the instant invention can be effectively utilizied for manufacturing fiber optic cables of substantially reduced sectional dimension. As a result, since a greater number of cables can be installed in a particular conduit when the cables have reduced sectional dimensions, the transmission capacity of the conduit can be effectively increased by utilizing cables constructed with the strength element of the instant invention.

Accordingly, it a primary object of the instant invention to provide an effective strength element for a fiber optic cable which allows the cable to be constructed with a reduced sectional dimension.

Another object of the instant invention is to provide a strength element which is made of a fiber reinforced resin material and which includes a plurality of substantially longitudinally extending ribs thereon which define grooves therebetween for receiving optical fibers.

An even further object of the instant invention is to provide a strength element which can be utilized for constructing fiber otpic cables having reduced material costs.

A still further object of the instant invention is to provide a strength element for a fiber optic cable which is made of a fiber reinforced resin material and which includes a plurality of substantially longitudinally extending ribs which define grooves therebetween for receiving optical fibers, wherein the strength element has increased resistance to breakage during bending.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
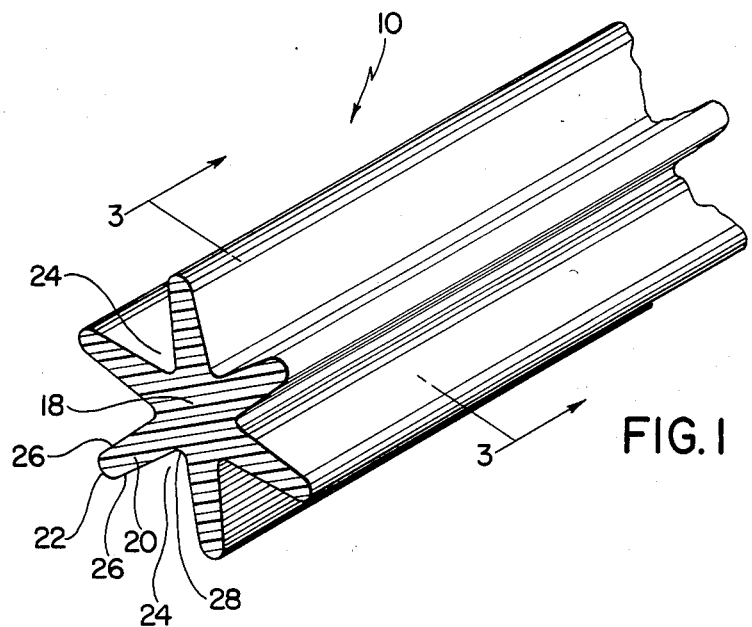
FIG. 1 is a perspective view of a first embodiment of the strength element of the instant invention.
Figure 2:
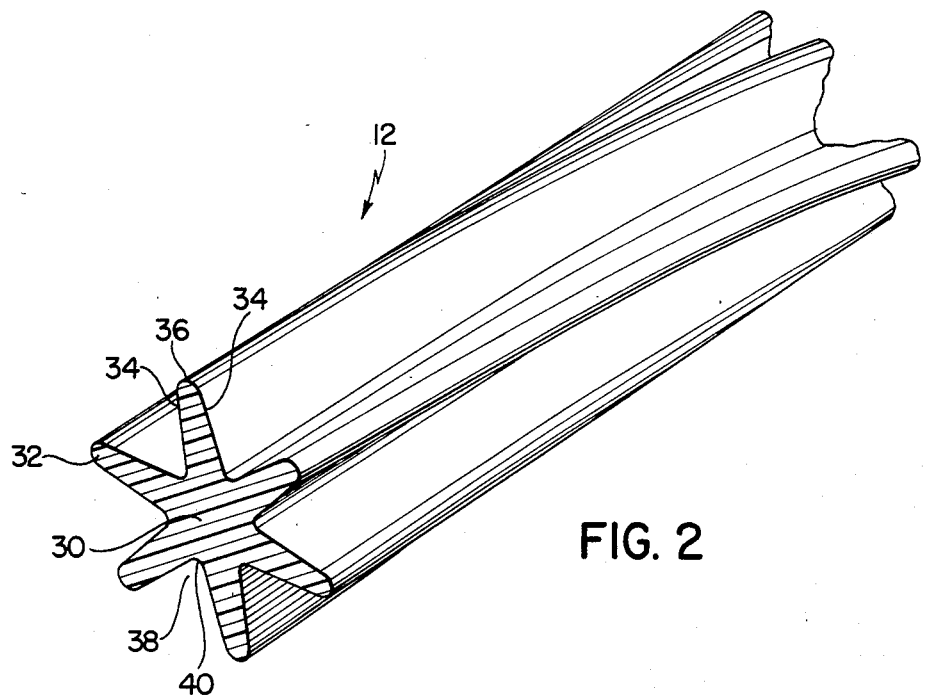
FIG. 2 is a perspective view of a second embodiment of the strength element.
Figure 3:
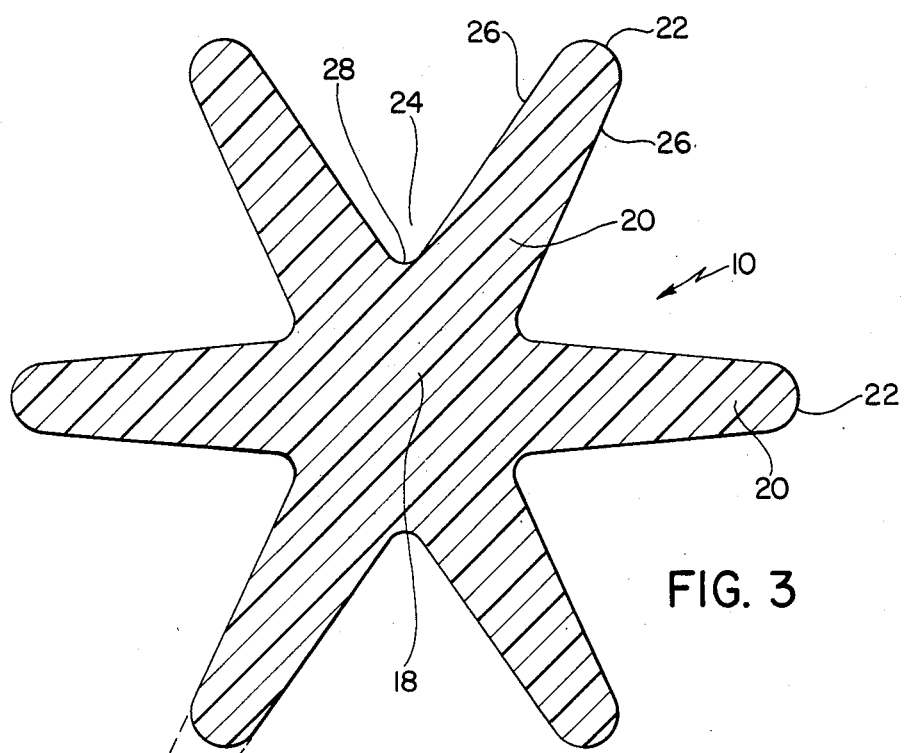
FIG. 3 is a cross sectional view taken along line 3—3 in FIG. 1.
Figure 4:
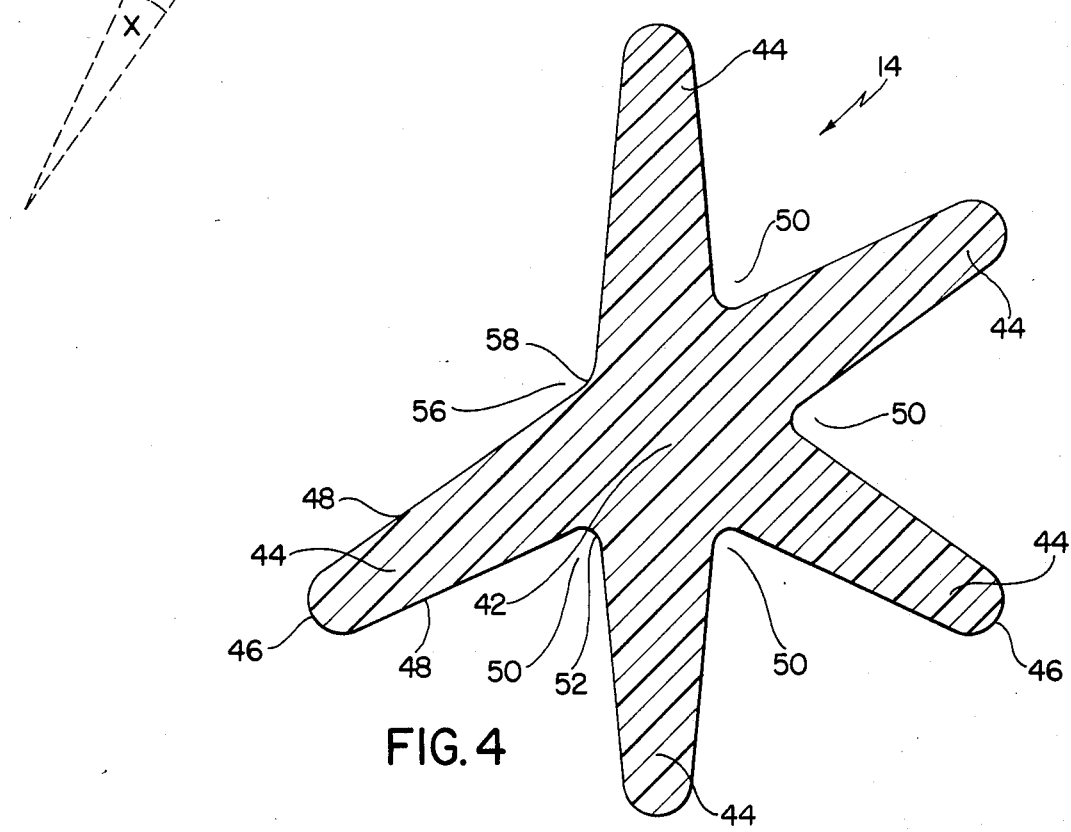
FIG. 4 is a cross sectional view of a third embodiment of the strength element.

Referring now to the drawings, a first embodiment of the strength element of the instant invention is illustrated and generally indicated at 10 in FIGS. 1 and 3, and second and third embodiments of the strength element are illustrated in FIGS. 2 and 4, respectively, and generally indicated at 12 and 14, respectively. The strength elements 10, 12 and 14 are preferably made in continuous saturation processes and they are constructed so that when they are assembled in fiber optic cables, they are operative for aligning and positioning optical fibers in the cables and also for providing reinforcements for the fibers which minimize the stresses thereon, particularly during the installations of the cables in conduits and during normal use.

The strength element 10, which is illustrated in FIGS. 1 and 3, is constructed so that it has a relatively low expansion coefficient and a relatively high elastic modulus and it comprises a longitudinally extending central portion 18 and a plurality of longitudinally extending ribs generally indicated at 20 which extend outwardly from the central portion 18. The strength element 10 is integrally formed from a fiber reinforced resin material, wherein the resin thereof preferably comprises an epoxy or polyester resin, although the use of other resins, such as polyurethane, phenolic, or acrylic resins or mixtures of resins is contemplated. Preferably the strength element 10 contains reinforcing fibers of glass, ceramic, carbon or aramid materials, such as Kevlar (Dupont TM), or other polymeric fibers which have high moduli of elasticity and high strengths and which are embedded in the resin thereof in substantially longitudinally extending relation, and the element 10 is preferably formed so that the ribs 20 thereof extend substantially radially outwardly from the central portion 18 and terminate in terminal ends 22 having rounded sectional configurations. The ribs 20, which cooperate to define a plurality of substantially longitudinally extending grooves 24 therebetweeen, are preferably formed with opposite sides or faces 26 which define outwardly tapered configurations in the ribs 20. In this regard, each pair of the sides 26 preferably cooperates to define an angle X therebetween which is preferably between approximately 6° and 70° to provide increased resistance to breakage during bending of the strength element 10. Further, the strength element 10 is preferably formed so that the inner extremities 28 of the grooves 24 have rounded sectional configurations, since it has been found that this also substantially increases the resistance of the strength element 10 to breakage during bending. In particular, the inner extremities 28 are preferably formed so that the radii of curvature thereof are between 1 an 1/20 of the outward extents of the adjacent ribs 20 from the central portion 18 in order to provide maximum resistance to breakage, i.e. to reduce the minimum bending radius of the element 10. For use of the strength element 10 in a fiber optic cable, the optical fibers of the cable are preferably assembled in longitudinally extending relation in the grooves 24 and they may be embedded in a waterproof gel to prevent water from penetrating the cable. After the fibers have been assembled in the grooves 24, tapes and/or other conventional casings or jackets are preferably applied over the strength element and the fibers as desired to provide a finished cable. However, because of the configuration of the strength element 10 and because the optical fibers of the cable constructed therewith are received in the grooves 24, it is possible for the cable to be constructed so that it has a reduced overall sectional dimension. Further, because the strength element 10 is formed with the outwardly tapered walls 26, the roundd inner extremities 28 and the rounded terminal ends 22, it is highly resistant to breakage during bending.

The strength element 12, which is also integrally formed from a fiber reinforced resin material, is similar to the strength element 10 and it comprises a longitudinally extending central portion 30 and a pluraltiy of longitudinally extending ribs 32 which extend outwardly from the central portion 30 and which are preferably tapered in their outward extents in the manner hereinabove set forth relative to the strength element 10. In this regard, the ribs 32 are preferably formed with outer sides or faces 34 which define angles therebetween of approximately 6° and 70° and the ribs 32 are preferably further formed with rounded terminal ends 36. The ribs 32 cooperate to define grooves 38 therebetween which have rounded inner extremities 40 and the rounded inner extremities 40 preferably have radii of curvature which are between 1 and 1/20 of the outward extents of the respective adjacent ribs 32. The strength element 12 is, however, formed so that the ribs 32 twist of spiral slightly around the central portion 30 in their longitudinal extents as illustrated in FIG. 2. While it has been found that in some instances this may slightly reduce the resistance of the strength element 12 to breakage during bending, it substantially reduces the stresses on optical fibers received in the grooves 38 during bending and hence, for many applications the strength element 12 is preferable for this reason. For use of the strength element 12 it is preferably assembled with optical fibers in the manner set forth relative to the strength element 10 to provide a reinforcing element for them which also orients the fibers in a cable.

Referring to the FIG. 4, the strength element 14 which has an asymmetrical sectional configuration is illustrated. The strength element 14 is also formed from a fiber reinforced resin material and it comprises a longitudinally extending central portion 42 and a plurality of longitudinally extending ribs 44 which extend outwardly from the central portion 42 and terminate in rounded ends 46. The ribs 44 preferably extend outwardly from the central portion 42 in substantially radial relation and they are tapered in their outward extents. Further the ribs 44 preferably have sides or faces 48 which define angles therebetween of between approximately 6° and 70°. The strength element 14 comprises five ribs 44 which define four substantially uniform grooves 50 having rounded inner extremities 52, and one pair of adjacent ribs 44 cooperate to define an enlarged groove 56 therebetween having a rounded inner extremity 58. Accordingly, the strength element 14 has an asymmetrical sectional configuration which permits the different grooves 50 to be easily distinguished from one another and also from the groove 56. For use of the strength element 14, it is assembled with optical fibers and other components in the manner hereinabove described relative to the strength element 10. However, when the strength element 14 is assembled in a cable, the asymmetrical sectional configuration thereof allows the optical fibers in one of the grooves 50 or 56 to be distinguished from the optical fibers in the other grooves to allow them to be spliced and/or terminated in properly aligned relation with corresponding fibers in other cable sections or with terminal elements.

It is seen therefore that the instant invention provides an effective strength element for a fiber optic cable which has substantial advantages over the heretofore available strength elements. The strength elements 10, 12 and 14 can all be utilized for providing fiber optic transmission cables of reduced sectional dimensions and the specific structural features hereinabove set forth make them highly resistant to breakage during bending. Further the strength elements 10, 12 and 14 are all operative for both reinforcing and aligning the optical fibers of fiber optic cables so that the fibers are protected against breakage due to mechanical stresses. Accordingly, for these reasons as well as the other reasons hereinabove set forth it is seen that the instant invention represents a significant advancement in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A strength element for a fiber optic cable comprising an elongated central portion and at least three substantially longitudinally extending ribs which extend outwardly from said central portion to define substantially longitudinally extending grooves therebetween for receiving optical fibers therein, the inner extremities of said grooves being of rounded configuration, said ribs being tapered in their outward extents from said central portion, said central portion and said ribs being integrally formed of a resin material reinforced with fibes, wherein the fibers are selected from the group comprising glass fibers, ceramic fibers, carbon fibers and aramid fibers.

2. The strength element of claim 1, wherein said ribs extend substantially radially outwardly from said central portion.

3. The strength element of claim 2, wherein the opposite sides of each of said ribs define an angle therebetween of between approximately 6° and 70°.

4. The strength element of claim 1, wherein said grooves have radii of curvature between approximately 1 and 1/20 of the outward extents of the adjacent ribs from said central portion.

5. The strength element of claim 1, wherein the outer extremities of said ribs have a rounded configuration.

6. The strength element of claim 1, having an asymmetrical cross sectional configuration.

* * * * *